(12) United States Patent
Forero et al.

(10) Patent No.: US 11,698,197 B2
(45) Date of Patent: Jul. 11, 2023

(54) HEATING PAINT, SURFACE HEATING DEVICE, AND KIT FOR PRODUCING A SURFACE HEATING DEVICE

(71) Applicant: Future Carbon GmbH, Bayreuth (DE)

(72) Inventors: Stefan Forero, Weidenberg (DE); Ortrud Aschenbrenner, Bayreuth (DE); Thomas Kandziora, Landsberg (DE); Walter Schütz, Weidenberg (DE); Klaus Zeyn, Munich (DE)

(73) Assignee: Future Carbon GmbH, Bayreuth (DE)

( * ) Notice: Subject to any disclaimer, the term of this patent is extended or adjusted under 35 U.S.C. 154(b) by 411 days.

(21) Appl. No.: 16/345,111

(22) PCT Filed: Oct. 27, 2017

(86) PCT No.: PCT/EP2017/077586
§ 371 (c)(1),
(2) Date: Apr. 25, 2019

(87) PCT Pub. No.: WO2018/078087
PCT Pub. Date: May 3, 2018

(65) Prior Publication Data
US 2019/0264926 A1 Aug. 29, 2019

(30) Foreign Application Priority Data
Oct. 28, 2016 (DE) .................... 10 2016 120 724.1

(51) Int. Cl.
*F24D 13/02* (2006.01)
*B05D 7/00* (2006.01)
(Continued)

(52) U.S. Cl.
CPC ............ *F24D 13/024* (2013.01); *B05D 7/00* (2013.01); *F24D 19/1096* (2013.01); *H05B 3/06* (2013.01);
(Continued)

(58) Field of Classification Search
CPC ..... F24D 13/024; F24D 19/1096; B05D 7/00; B05D 2520/00; B05D 2602/00; H05B 3/06; H05B 3/145; H05B 3/20; Y02B 3/00
See application file for complete search history.

(56) References Cited

U.S. PATENT DOCUMENTS 3,696,054 A * 10/1972 Saunders ................. G21C 3/32
252/511
3,866,016 A   2/1975 Tombu
(Continued)

FOREIGN PATENT DOCUMENTS

DE            19647935 B4 * 11/2006 ........... B60H 1/2225
DE        202014009744 U1    3/2015
(Continued)

OTHER PUBLICATIONS

European Patent Office, International Search Report in International Application No. PCT/EP2017/077586 (dated Jan. 31, 2018).
(Continued)

*Primary Examiner* — Shawntina T Fuqua
(74) *Attorney, Agent, or Firm* — Neal, Gerber & Eisenberg LLP

(57) ABSTRACT

The present invention relates to a heating paint which can be used to generate a surface heating device on a wall. The invention further relates to a surface heating device which is suitable in particular for heating a room, and also to a kit for producing a surface heating device on a wall. The invention relates, moreover, to uses of the subjects of the invention, especially for producing a surface heating device and, respectively, for heating a room, and to corresponding methods.

22 Claims, 4 Drawing Sheets

(51) Int. Cl.
*F24D 19/10* (2006.01)
*H05B 3/06* (2006.01)
*H05B 3/14* (2006.01)
*H05B 3/20* (2006.01)

(52) U.S. Cl.
CPC ............... *H05B 3/145* (2013.01); *H05B 3/20* (2013.01); *B05D 2520/00* (2013.01); *B05D 2602/00* (2013.01); *Y02B 30/00* (2013.01)

(56) References Cited

U.S. PATENT DOCUMENTS

2002/0117495 A1* 8/2002 Kochman ............ F24D 13/024
219/549
2016/0021704 A1* 1/2016 Elverud ................ H05B 3/58
252/502
2016/0302260 A1* 10/2016 Miller .................... H01B 1/18

FOREIGN PATENT DOCUMENTS

WO   WO-2014091161 A1 * 6/2014  ............... C09D 5/24
WO   WO 2018/078087 A1   5/2018

OTHER PUBLICATIONS

European Patent Office, Written Opinion of the International Searching Authority in International Application No. PCT/EP2017/077586 (dated Jan. 31, 2018).

The International Bureau of WIPO, International Preliminary Report on Patentability in International Application No. PCT/EP2017/077586 (dated Apr. 30, 2019).

* cited by examiner

HEATING PAINT, SURFACE HEATING DEVICE, AND KIT FOR PRODUCING A SURFACE HEATING DEVICE

FIELD OF THE INVENTION

The present invention relates to a heating paint which can be used easily even by the uninitiated to generate a surface heating device on a wall. The invention further relates to a surface heating device which is suitable in particular for heating a room, such as a room in a house, and also to a kit for producing a surface heating device on a wall. The invention relates, moreover, to uses of the subjects of the invention, especially for producing a surface heating device and, respectively, for heating a room, and to corresponding methods.

BACKGROUND

There are many situations in life that require the heating of the surface of an object or body, and in many such locations it is possible to do this using electrical heating elements consisting, for example, of meandering heating wires. One disadvantage of this kind of heating is that damage to the heating wire at only one point is accompanied by failure of the entire heating element. Moreover, because only a small part of these electrical heating elements (namely the heating wires) generate the desired heat, to allow the entire heating element to provide a desired amount of heat, there may be unwanted hotspots and it may not be possible to guarantee an even distribution of temperature.

To circumvent these problems there are also heating elements known that are based on the application of a voltage and/or an electrical current to a heating layer in which electrically conductive fibrous materials (such as carbon fibers or carbon nanotubes) are in substantially uniform distribution; cf. DE 20 2010 009 208 U1 and DE 20 2014 009 744 U1. For such heating elements to be produced it is therefore necessary that first of all liquid dispersions can be produced in which the electrically conductive fibrous materials are likewise present in substantially uniform distribution. On account of their high propensity to self-aggregation, however, these fibrous, electrically conductive materials have the disadvantages that converting them into dispersions can be done only with difficulty and with high levels of technical cost and complexity, and that the dispersed fibers have a strong propensity to reaggregation. As a result of this, on the one hand the production costs for dispersions of fibrous conductivity additives (and hence also for the heating elements that can be produced from them) are very high and on the other hand such dispersions, especially those based on water, have a low stability in storage and would therefore have to be redispersed prior to application, at great technical cost and complexity.

SUMMARY OF THE INVENTION

It is an object of the present invention, therefore, to provide a heating paint which is stable in storage and can easily be used even by the uninitiated to generate a surface heating device on a wall.

This object is achieved in accordance with the invention by the subjects described in the claims.

In particular the invention relates in a first aspect to a heating paint which comprises at least two conductivity additives and at least one binder, the conductivity additives comprising graphite and carbon black, the binder comprising an electrically nonconductive polymer, and the heating paint being free from electrically conductive carbon fibers and carbon nanotubes. Alternatively the heating paint comprises at least two conductivity additives and at least one inorganic binder, the conductivity additives comprising graphite and carbon black and the heating paint being free from electrically conductive carbon fibers and carbon nanotubes.

In a second aspect, the invention provides a surface heating device which comprises the following components: (a) a heating layer which can be applied to the wall to be heated and comprises at least two conductivity additives and at least one binder, the conductivity additives comprising graphite and carbon black, the binder comprising an electrically nonconductive polymer or an inorganic binder, and the heating layer being free from electrically conductive carbon fibers and carbon nanotubes; (b) two electrically conductive contact elements, which can be or are arranged on the heating layer in such a way that electrical voltage and/or electrical current can be applied to the heating layer; and (e) two transition elements which are or can be mounted to the contact elements, in particular with electrical conduction, each of the two transition elements comprising a retaining element for positively and/or nonpositively securing the transition element on the wall, in a region of the wall to be heated that does not bear any applied heating layer and any applied contact element. In one embodiment the surface heating device of the invention further comprises (c) a control element which comprises a voltage source and a control device for controlling the surface heating device; and (d) two electrical leads, the first electrical lead being connected to one of the terminals of the voltage source, and the second electrical lead being connected to the other terminal of the voltage source; the first transition element connecting the first electrical lead, with electrical conduction, to one of the two electrically conductive contact elements, and the second transition element connecting the second electrical lead, with electrical conduction, to the other of the two electrically conductive contact elements.

In a third aspect, the invention provides a kit for producing a surface heating device on a wall, the kit comprising the following components: (1) a heating paint of the invention, as described herein in the first aspect, i.e., a heating paint which comprises at least two conductivity additives and at least one binder, the conductivity additives comprising graphite and carbon black, the binder comprising an electrically nonconductive polymer or an inorganic binder, and the heating paint being free from electrically conductive carbon fibers and carbon nanotubes; (2) at least two electrically conductive contact elements; and (5) at least two transition elements which can be mounted to the contact elements, in particular with electrical conduction, each of the two transition elements comprising at least one retaining element for positively and/or nonpositively securing the transition element on a wall. In one embodiment the kit of the invention further comprises (3) a control element which comprises a voltage source and a control device for controlling the surface heating device; and (4) at least two electrical leads, and optionally (6) a set of use instructions.

In a fourth aspect, the invention provides the use of a heating paint of the invention or of a kit of the invention for producing a surface heating device on a wall.

In a fifth aspect, the invention provides the use of a surface heating device of the invention for heating a room or for shielding the room from electromagnetic radiation.

In a sixth aspect, the invention provides a method for producing a surface heating device on a wall, which comprises the step of applying a heating paint of the invention to the wall.

In a seventh aspect, the invention provides a method for heating a room, which comprises the steps of: (i) applying a heating paint of the invention to at least one wall of the room that is to be heated, to generate at least one heating layer, and (ii) applying electrical voltage and/or electrical current to the heating layer.

In one embodiment of the sixth or seventh aspect, the method further comprises the following steps: (a) mounting two contact elements for each of the at least one heating layer on the wall to be heated; (b) providing two transition elements which can be mounted to the contact elements, in particular with electrical conduction, for each of the at least one heating layer, each of the two transition elements comprising a retaining element for positively and/or nonpositively securing the transition element on the wall; and (c) producing an electrically conducting connection between the first contact element and the first transition element and also between the second contact element and the second transition element for each of the at least one heating layer; and optionally (d) positively and/or nonpositively securing the transition elements on the wall.

DETAILED DESCRIPTION OF THE INVENTION

Heating Paint

Figure 1:
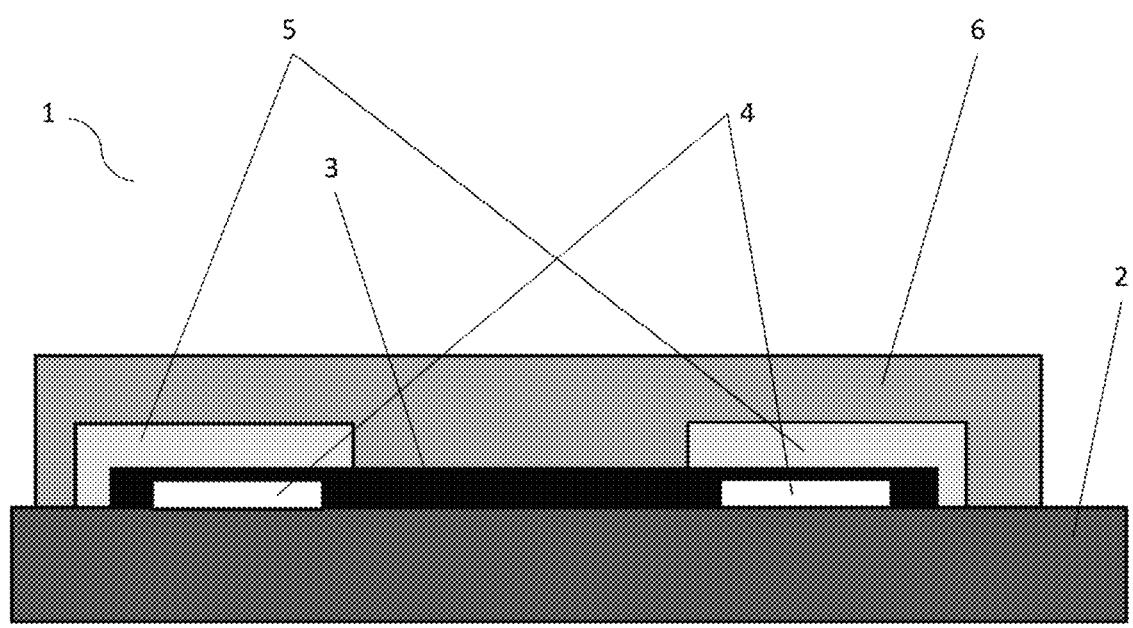
FIG. 1 shows a schematic sectional view, not true to scale, of the surface heating device (1) of the invention as mounted on a (possibly already primed) wall (2) that is to be heated.

Although the first aspect of the present invention relates to a heating paint, the intention is that the term "heating paint" should also be understood to encompass synonymous terms such as "heating coating" and "heating varnish".

The graphite and carbon black components present in the heating paint of the invention are electrically conducting materials, which are referred to herein as conductivity additives. The skilled person is aware of conductivity additives other than graphite and carbon black, examples being carbon nanotubes, carbon fibers, and carbon nanofibers. On account of their high propensity to self-aggregation, however, these fibrous conductivity additives have the disadvantages that converting them into dispersions can be done only with difficulty and with high levels of technical cost and complexity, and that the dispersed fibers have a strong propensity to reaggregation. As a result, on the one hand the production costs of dispersions of fibrous conductivity additives are very high and on the other hand such dispersions have a low stability in storage.

In order to avoid these disadvantages, the heating paint of the invention is free from electrically conductive carbon fibers and carbon nanotubes, more particularly free from electrically conductive carbon fibers, carbon nanofibers, and carbon nanotubes. The expression "free from electrically conductive carbon fibers and carbon nanotubes" in this context means that the contribution made by the electrically conductive carbon fibers and carbon nanotubes to the electrical conductivity in the heating paint of the invention is substantially negligible in relation to the contribution made by graphite and carbon black to the electrical conductivity in the heating paint of the invention. This is the case, for example, if the electrically conductive carbon fibers and carbon nanotubes are present in a total amount of less than 0.5% (preferably less than 0.1%, more preferably less than 0.05%, more preferably less than 0.01%, more preferably less than 0.005%, more preferably less than 0.001%, more preferably less than 0.0005%, more preferably less than 0.0001%) in relation to the total weight of the graphite and carbon black conductivity additives contained in the heating paint of the invention. The expression "free from electrically conductive carbon fibers and carbon nanotubes" in relation to the heating layer contained in the surface heating device of the invention is to be interpreted analogously; in other words, the contribution made by the electrically conductive carbon fibers and carbon nanotubes to the electrical conductivity in the heating layer is substantially negligible in relation to the contribution made by the graphite and carbon black to the electrical conductivity in the heating layer (for example, if the electrically conductive carbon fibers and carbon nanotubes are present in a total amount of less than 0.5% (preferably less than 0.1%, more preferably less than 0.05%, more preferably less than 0.01%, more preferably less than 0.005%, more preferably less than 0.001%, more preferably less than 0.0005%, more preferably less than 0.0001%) in relation to the total weight of the graphite and carbon black conductivity additives contained in the heating layer). The expression "free from electrically conductive carbon fibers, carbon nanofibers, and carbon nanotubes" is also to be understood analogously (i.e., the contribution made by the electrically conductive carbon fibers, carbon nanofibers, and carbon nanotubes to the electrical conductivity in the heating paint (or heating layer, respectively) is substantially negligible in relation to the contribution made by the graphite and carbon black to the electrical conductivity in the heating paint (or heating layer, respectively), if, for example, the electrically conductive carbon fibers, carbon nanofibers, and carbon nanotubes are present in a total amount of less than 0.5% (preferably less than 0.1%, more preferably less than 0.05%, more preferably less than 0.01%, more preferably less than 0.005%, more preferably less than 0.001%, more preferably less than 0.0005%, more preferably less than 0.0001%) in relation to the total weight of the graphite and carbon black conductivity additives contained in the heating paint (or heating layer, respectively)).

In one embodiment the heating paint of the invention (and, respectively, the heating layer which can be generated from it) comprises only graphite and carbon black as conductivity additives.

The properties of the aforesaid conductivity additives are elucidated with more precision below.

Graphite is a much-abundant mineral belonging to the order of the semimetals and nonmetals. Alongside diamond and fullerenes, it is the third form (modification) of carbon that is stable under standard terrestrial conditions, and it crystallizes usually in the hexagonal and also, albeit very rarely, in the trigonal crystal system.

Graphite develops opaque gray to black crystals in hexagonal, tabular, platy or columnar form, which display metallic luster on the crystal faces.

In the crystalline graphite there are planar layers running in parallel, the "basal planes" or "graphene layers". A layer consists of covalently linked hexagons whose carbon atoms are $sp^2$-hybridized. The bond energy between the carbon atoms within these planes is 4.3 eV, whereas between them it is only 0.07 eV. This extreme directional dependence of the bonding forces results in a marked anisotropy in the mechanical, electrical, and thermal properties of graphite:
  ready cleavability of the pure graphite along the basal planes, significantly higher strength along the crystal layers;
  thermal and electrical insulation orthogonally to the basal planes, contrasting with an almost metallic conductivity along the planes.

The conductivity within a plane is made possible by the delocalization of the π electrons. Where the planes have no solid correlation to one another, the term "turbostratic carbon" is used. Graphite can also be synthetic in origin, as a product of the coking of correspondingly suitable plastics, pitch, mineral oil, coal, and the like.

Carbon black is a black solid of powder form which according to quality and use has a carbon content of 80% or more.

Depending on their field of application, carbon blacks possess specific profiles of properties, which are influenced in a targeted way through the nature of the production method and through variation in the operating parameters.

Carbon blacks, their properties, production methods, uses, and so on have already been extensively described, and so at this point reference is made to the relevant technical literature.

Carbon nanotubes (CNTs) consist of coherent graphene layers rolled up to form a cylinder. Individual tubes are called "single-walled carbon nanotubes" (SWCNTs); particles of concentrically stacked tubes of increasing diameter are called "multi-walled carbon nanotubes" (MWCNTs).

There are various techniques via which CNTs can be produced. The best-known are the arc process, the laser ablation process, and catalytically assisted vapor deposition (CCVD). The latter process is suitable for industrial production of CNTs. It sees the CNTs being formed from gaseous carbon sources (hydrocarbons, alcohols, CO, $CO_2$) on metallic, catalytically active substrates.

SWCNTs typically have a diameter of 0.5-4 nm, MWCNTs a diameter of between 6 and 100 nm. The length of CNTs can be up to several mm.

The physical properties of CNTs correspond very largely to those of graphite along the basal planes.

CNTs are nowadays used as mechanical reinforcement and as electrically and thermally conductive additive in polymers, ceramics, and metals. For these uses the CNTs are often modified chemically on their surface so as to satisfy the requirements of ready dispersibility and attachment to the matrix, which may also be termed the base material of the heating means. Generally speaking, the CNTs are added to the matrix material. Accordingly, the term "CNTs" is intended to embrace both unmodified and modified (especially sidewall-modified) CNTs. Because of the high aspect ratio and the high specific surface area, only composites of relatively low CNT content can be produced.

Carbon fibers are fibers produced industrially. They are typified as isotropic and anisotropic, with isotropic fibers being only low in strength and with anisotropic fibers being distinguished by high strengths and stiffnesses in conjunction with low elongation at break in the axial direction. The diameter of a carbon fiber is approximately 5 to 9 μm and is therefore larger than that of carbon nanofibers or CNTs.

Carbon nanofibers (CNFs) consist of graphene layers stacked one atop another along the filament axis. The angle (the orientation) of the graphene planes with respect to the filament axis is employed for a rough differentiation. "Herringbone" CNFs, accordingly, possess graphene planes arranged at an angle ≠90°. These CNFs may be solid or else hollow. Their diameters are in the 50 nm–1 μm range and their lengths may be up to mm. Where the graphene layers are arranged at an angle=90° to the filament axis, the term "platelet" CNFs is used. Their diameters are in the range from 50 to 500 nm and their lengths may be up to 50 μm.

These CNFs are generally produced via CVD. Applications thereof are primarily in catalysis, as a catalyst support, and as active additives in Li-ion batteries, or in gas storage.

In the heating paint of the invention there is at least one binder, the binder preferably comprising an electrically nonconducting polymer. "Binder" in accordance with the invention refers to a compound by means of which particles (e.g., conductivity additives, especially graphite and carbon black) can be applied to a wall in such a way that the particles together with the binder (and optionally with further substances) adhere on the wall. The binder therefore promotes the cohesion of the particles in the heating paint/heating layer, and the adhesion of the heating paint/heating layer on the wall. Binders may be organic or inorganic in form. Prior to application to the wall, the binder and the particles (and any further substances such as adjuvants) are intensely mixed so that they are uniformly distributed and all the particles are uniformly wetted with the binder.

The non-electrically conductive polymer present in the heating paint and the heating layer is not subject to particular limitation, and includes various kinds of polymers, especially thermoplastic polymers (or simply thermoplastics), elastomers, and reactive resins, optionally in a mixture with one or more adjuvants (such as curing agents and accelerators). Polymers are chemical compounds constructed of one or a few kind(s) of units of the same type (monomers). Such molecules are usually catenary or branched in construction and have covalent bonds between the monomers. Described below are a number of examples—not exclusive, however—of preferred polymers, which may each be employed individually or else in any desired combination. The proportion of the non-electrically conductive polymer in the heating paint may be 10 to 90% (for example, 20 to 80%, 30 to 75%, or 40 to 60%) according to weight. The proportion of the non-electrically conductive polymer in the heating layer may be 10 to 95% (for example, 20 to 85%, 30 to 80%, or 40 to 75%) according to weight.

Exemplary groups of thermoplastic polymers encompass the following:
  Polyolefins (such as polypropylene, polyethylene, polybutylene, polyisobutylene, etc.)
  Polyamides (such as, for example, nylon 66, nylon 12, nylon 11, nylon 6, etc.)
  Polyacrylic polymers (such as polymethyl methacrylate, polyacrylonitrile, polyacrylic acid and derivatives, etc.)
  Fluoropolymers (such as polytetrafluoroethylene, polyvinylidene fluoride, etc.)
  Aliphatic and aromatic polyesters (such as, for example, polyglycols, polyethylene terephthalate, etc.)
  Polyimides (such as, for example, polyetherimide)
  Poly(aryl)etherketones (such as, for example, polyetherketones, polyetheretherketones, etc.)
  Polysulfides (such as, for example, polyphenylene sulfide, polyphenylene sulfone, polysulfone, polyethersulfone, etc.)
  Polyacetals
  Cellulose and its derivatives (such as, for example, cellulose nitrates, acetates, acetate butyrates, etc.)

Vinyl polymers (such as, for example, polyvinyl chloride, polyvinyl acetate, polyvinyl alcohol, polyvinyl butyral, polyvinylpyrrolidone, etc.)

Exemplary groups of elastomers encompass the following:

Natural rubbers, which may contain chlorine, styrene, nitrile, sulfur or oxygen substituents Isoprene rubbers, which may contain chlorine, styrene, nitrile, sulfur or oxygen substituents Butadiene rubbers, which may contain chlorine, styrene, nitrile, sulfur or oxygen substituents Other rubbers, which may contain chlorine, styrene, nitrile, sulfur or oxygen substituents Silicone elastomers Polyurethanes An example of reactive resins is an epoxy-resin resin containing epoxy group-containing monomers, oligomers and/or polymers. Epoxy resins may be based on aromatic monomers (e.g., on bisphenol A, bisphenol F, novolac, and others), aliphatic monomers or cycloaliphatic monomers. Nonlimiting examples of the latter group include 3,4-epoxycyclohexylmethyl 3,4-epoxycyclohexanecarboxylate, bis((3,4-epoxycyclohexyl)methyl) adipate and other derivatives of higher or else lower molecular weight. The epoxy resins may have functionalities of one, two, three, four or more and embrace all molecular weights.

Further groups of reactive resins represent cyanate esters and isocyanates, and individual representatives thereof include, without limitation, 2,4-diisocyanato-1-methylbenzene, 1-isocyanato-4-[(4-isocyanatophenyl)methyl]benzene, 1,1-bis(4-cyanatophenyl)ethane, 2,2-bis(4-cyanatophenyl)propane, oligo(3-methylene-1,5-phenylene cyanate), and other derivatives of higher or else lower molecular weight.

Another group of reactive resins is the group of linear and branched diols and polyfunctional alcohols, such as oligo- and polyester-polyols and polyether-polyols.

A further group of reactive resins is the group of reactive polyimide systems. Reactive polyimide systems may comprise monofunctional monomers (such as, for example, N-phenylmaleimide, 2,6-xylylmaleimide, N-cyclohexylmaleimide, etc.) and/or difunctional monomers (such as, for example, 4,4'-diphenylmethanebismaleimide, N,N'-(4-methyl-m-phenylene)bismaleimide, N,N'-m-phenylenebismaleimide, bisphenol A diallyl ether, o,o'-diallylbisphenol A, polyphenylmethanebismaleimide, polybenzimidazole, etc.).

A further group of reactive resins is the group of phenolic resins. Nonlimiting examples include those based on novolac or resole.

Further exemplary groups of reactive resins include the following:

Unsaturated polyester resins and vinyl ester resins

Alkyd resins

Melamine resins

Polysilanes and silicones

Acrylates (including methacrylates)

Poly quinoxalines

Pitches and bitumen

Also present may be curing agents and/or accelerators, such as amines, amides, amidoamines, amino alcohols, amino acids, anhydrides, imidazoles, cyanamides, alcohols, phenols, polyols, cyanates, mercaptans, carboxylic acids, metal complexes, etc. A "curing agent" in accordance with the invention means a compound by which a multiplicity of individual basic building blocks (of a binder, for example) are linked to form a three-dimensional network. The curing agent preferably has at least two functional groups, which are capable of reacting with a binder and which may be alike or different. The proportion of the curing agent/accelerator in the heating paint/heating layer is preferably stoichiometric in respect of the particular reactive resin (in other words, the amount of the curing agent/accelerator is such that theoretically it is possible for almost every curing-agent/accelerator molecule to react with one reactive-resin molecule; the amount of curing agent/accelerator is preferably 80 to 150% (such as 85 to 130%, 90 to 120%, 95 to 110%, 97 to 105%, 98 to 102% or 100%), based on the molar amount of the reactive resin in the heating paint (or heating layer, respectively)).

It may be preferable for the heating paint to contain no organic binders. In that case the heating paint of the invention may comprise one or more inorganic binders instead of the electrically nonconducting polymer. The term "inorganic binder" in accordance with the invention relates to a mineral substance which on mixing with water produces a paste, more particularly a processible paste, which is subsequently hardened or hardenable. In the solid and/or hardened state, the inorganic binder is preferably electrically nonconducting. Hardening may take place hydraulically (i.e., with and under water; example: cement, magnesia binder), carbonatically (example lime), hydratically (example: gypsum), or otherwise (e.g., polymerically; example: waterglass) or with hybrid setting. Nonlimiting examples of inorganic binders include cement (such as Portland cement, high-alumina cement (calcium aluminates), quick-setting Portland cement (calcium silicates, anhydrite ($CaSO_4$)), calcium sulfoaluminate cement (ye'elimite, belite, anhydrite), sulfate slag cement (slag sand, anhydrite, calcium silicates)), lime (such as caustic lime (CaO) or slaked lime ($Ca(OH)_2$)), gypsum (such as anhydrite ($CaSO_4$), hemihydrate ($CaSO_4.0.5H_2O$) or dihydrate ($CaSO_4.2H_2O$)), magnesia binder (magnesia, magnesium salts), waterglass (alkali silicates, more particularly sodium and/or potassium silicates), and geopolymers (e.g., aluminosilicates such as clays). Preferred examples of inorganic binders are caustic lime, slaked lime, waterglass, gypsum, clay, and cement. The proportion of the inorganic binder in the heating paint may be 10 to 90% (for example, 20 to 80%, 30 to 75%, or 40 to 60%) according to weight. The proportion of the inorganic binder in the heating layer may be 10 to 95% (for example, 20 to 85%, 30 to 80%, or 40 to 75%) according to weight.

The heating paint of the invention takes the form preferably of a fluid dispersion, with the solid constituents (especially graphite and carbon black) being dispersed in the fluid phase.

Advantageously the heating paint comprises a dispersion medium, more particularly an eco-friendly dispersion medium (such as water). The heating paint is preferably substantially free from volatile organic compounds (more particularly substantially free from volatile organic solvents). The term "fluid" here is intended to mean fluid, in particular, in the physical sense, hence including viscous and/or nonnewtonian fluids. The expression "substantially free from volatile organic compounds" means in accordance with the invention that a mixture (e.g., the heating paint of the invention or the heating layer that can be generated from it) is to be so free from volatile organic compounds as is practically and realistically feasible. For example, if the mixture is substantially free from volatile organic compounds, the amount of volatile organic compounds in the mixture may be less than 1 wt % (e.g., less than 0.5 wt %, less than 0.4 wt %, less than 0.3 wt %, less than 0.2 wt %, less than 0.1 wt %, less than 0.09 wt %, less than 0.08 wt %, less than 0.07 wt %, less than 0.06 wt %, less than 0.05 wt %, less than 0.04 wt %, less than 0.03 wt %, less than 0.02 wt %, less than 0.01 wt %, less than 0.005 wt %, less than 0.001 wt %), based on the total weight of the mixture.

In one embodiment the heating paint of the invention comprises one or more adjuvants which are selected preferably from the group consisting of dispersants, wetting agents, rheological additives, corrosion inhibitors, agents for increasing the scratch resistance, and biocides.

The production of a number of possible heating paints is described hereinafter: For example, the solids can be wetted with a wetting agent so as to produce a pigment paste. The binder is mixed with the other adjuvants (if present) and this mixture is mixed with the pigment paste. In an alternative production method, all of the liquid constituents are mixed and the solids are added gradually with shearing.

Surface Heating Device

Heating Layer

A component contained in the surface heating device of the invention is the heating layer defined in the second aspect of the invention. A heating layer in the sense of the present invention refers to a foillike object which can be applied to or generated on a region of a wall of a room (in particular using the heating paint of the invention) and in which heat can be generated and from which heat can be delivered. In the case of the heating layer, the heat can be generated by the application of current. For this purpose, conductivity additives are provided in the heating layer. The presence of the graphite and carbon black conductivity additives gives the heating layer a low ohmicity, leading to good electrical conductivity, since there is only a low electrical resistance present. As a result, a homogeneous heatability can be realized. The low ohmicity ensures, moreover, that only low voltages and/or low currents need be applied to the heating layer in order to achieve effective heating.

The marginal regions of the heating layer represent, in particular, lateral marginal regions of the width of the heating layer. The width in this context refers preferably to a dimension which lies transverse to the direction of principal extent, more particularly the length, of the heating layer. The marginal regions extend in each case from the lateral margin of the heating layer and end at a distance from the center line of the heating layer, which lies in the direction of principal extent. This direction of principal extent may be a straight line or a curve. The contact elements therefore do not extend over the center line, and preferably end at a distance from the center line, with the distance advantageously being at least four times (such as at least five times, at least six times, at least seven times, or at least eight times) the width of a contact element.

According to one preferred embodiment, the heating layer has a width-to-length ratio of less than or equal to 1. With this embodiment, therefore, the heating layer has a strip or band form. The contact elements in this arrangement are located on the lateral marginal regions, meaning that they extend in the lengthwise direction of the striplike layer. The embodiment of the heating layer with a low width-to-length ratio has the advantage that to start with the distance between the contact elements is relatively low and hence reliable heating of the heating layer across the width can be ensured. The distance between the inside edges of the contact elements may advantageously be up to 2 m, preferably up to 1 m, such as 50 to 80 cm, preferably 60 to 75 cm, more preferably 65 to 70 cm.

In one embodiment of the surface heating device of the invention, the heating layer has the shape of a rectangle or parallelogram. There is no limit on the area of the heating layer. It may for example be up to 100 m$^2$, preferably up to 20 m$^2$, more preferably up to 10 m$^2$, such as 1 dm$^2$ to 50 m$^2$, more preferably 0.1 m$^2$ to 10 m$^2$, more preferably 0.5 m$^2$ to 8 m$^2$, more preferably 0.6 m$^2$ to 6 m$^2$, more preferably 0.7 m$^2$ to 4 m$^2$, more preferably 0.8 m$^2$ to 2 m$^2$, more preferably 0.90 to 1.10 m$^2$, preferentially 0.95 to 1.05 m$^2$.

The selected thickness of the heating layer is preferably low and is situated for example in the μm range (e.g., in the range from 40 to 200 pm, preferably 50 to 100 μm). A heating layer thickness of less than 100 μm, for example, may be sufficient to obtain the desired heating effect.

The surface heating device of the invention may comprise more than one heating layer (e.g., at least 2, at least 3 or at least 4 heating layers separate from one another), in which case for each heating layer there are two electrically conductive contact elements, two electrical leads, and two transition elements present, although all the heating layers may be connected to the same control element. The area of the individual heating layers may be the same or different and may be situated in each case within the above-specified range (for example, 0.1 to 10 m$^2$, such as 0.90 to 1.10 m$^2$, preferentially 0.95 to 1.05 m$^2$).

The quantity of heat delivered by the heating layer may be varied by means including the performance parameters of the voltage source (amount of current flowing through the heating layer, or voltage present at the heating layer; both may be controlled by the control device), the setting of the thickness of the heating layer and/or the concentration of the conductivity additives in the heating layer.

The heating layer of the invention may be operated with alternating-current (AC) voltage or direct-current (DC) voltage. The heating layer of the invention may be supplied with low voltage and nevertheless realize a sufficient heating effect. The heating layer may be operated with a supply starting from voltage values of greater than 0 V, preferably with a protective ultralow voltage (AC or DC voltage), more particularly in the range from 5 V to 48 V (such as in the range from 18 to 25 V, 22 V for example).

The heating layer can be generated on a wall in a conventional way using the heating paint of the invention. For example, the heating paint may be applied to the wall by rolling, spraying, spreading, brushing, knife coating, troweling, or printing, the invention giving preference to spraying, rolling, knife coating or printing. The heating paint may be applied in one step (i.e., in only one coat) or in two or more steps (i.e., in two or more coats), and in the latter case there may be a drying step in each case between the individual applications. The heating layer can be generated preferably by means of rolling in two coats (with a drying step in between) or by means of spraying in one coat.

It is possible optionally to generate a priming coat on the wall to be heated, before the heating layer is applied. This is especially advantageous in order to reduce the absorbency of the wall to be heated and/or to ensure a consistent surface quality of the wall to be heated.

Contact Elements

The two electrically conductive contact elements present in the surface heating device of the invention (in particular for each heating layer present in the surface heating device of the invention) serve for the application of electrical current and/or electrical voltage to the heating layer. The contact elements may in particular constitute contact bands or contact strips.

In one embodiment of the surface heating device of the invention, the two electrically conductive contact elements comprise electrically conductive metal strips, more particularly electrically conductive copper strips. Advantageously each contact element has an adhesive layer. The total thickness of each contact element (including adhesive layer, if present) may preferably be not more than 100 µm, more preferably not more than 90 µm, more preferably not more than 80 µm, more preferably not more than 75 µm.

In one embodiment the contact elements may take the form of linear strips. However, even for other embodiments, the shape of the contact elements is not limited to a linear configuration of this kind. The contact elements may be formed, for example, by strips which run in a curved shape in the direction of principal extent of the heating layer.

In one embodiment of the surface heating device of the invention, the two electrically conductive contact elements can be or are arranged on opposite marginal regions of the heating layer (e.g., the upper and lower marginal region, or the left-hand and right-hand marginal region).

In one embodiment of the surface heating device of the invention, the two electrically conductive contact elements are or can be arranged parallel to one another. The distance between the inside edges of the contact elements may advantageously be up to 2 m, preferably up to 1 m, such as 50 to 80 cm, preferably 60 to 75 cm, more preferably 65 to 70 cm.

The width of the contact elements is not critical. However, the contact elements ought to have a size such that they allow the heating layer to have electrical voltage and/or electrical current applied thereto, preferably over the entire length and/or width of the heating layer. For example, the width of the contact elements may be selected in relation to the width of the heating layer. A suitable width of the contact elements may be in the range from $\frac{1}{10}$ to $\frac{1}{40}$ (preferably $\frac{1}{12}$ to $\frac{1}{32}$, such as $\frac{1}{16}$ to $\frac{1}{24}$, such as $\frac{1}{20}$) of the width of the heating layer. The absolute width of the contact elements may be in the range from 2 to 8 cm (preferably 2.5 to 6.5 cm, such as 3.5 to 5 cm or 4 cm), in which case the sum total of the widths of the contact elements ought to be not more than half the width of the heating layer.

The electrically conducting contact elements extend preferably over the entire length of the heating layer. This has the advantage that current can flow through the heating layer across its width over its entire length, meaning that the area for heating is maximized. The contact elements may advantageously extend beyond one lengthwise end of the heating layer, in other words may overhang one lengthwise end. This likewise contributes to maximizing the area for heating, since, rather than a section of the contact elements which is in direct contact with the heating layer, only the overhanging remainder of the contact elements, which is not in direct contact with the heating layer, can be used or is usable for ensuring an electrically conducting connection (via transition element and electrical lead) to the voltage source.

The contact elements may be mounted on the wall in any known way, such as by adhesion, thermal spraying (such as arc spraying) or plasma spraying, for example. For ease of handling and production of the surface heating device, however, adhering the contact elements to the wall to be heated is preferred. For this embodiment, the contact elements preferably have an adhesive layer.

After the heating layer has been generated on the wall to be heated (with the wall optionally having had a priming coat generated thereon beforehand), the contact elements may be applied to this heating layer.

In this case it is preferred for the contact elements to be applied using suitable means which permit a flow of current, more particularly an unhindered flow of current, between the contact elements and the heating layer. This can be achieved, for example, by making the adhesive layer electrically conducting in the embodiment wherein the contact elements comprise an adhesive layer.

Alternatively the contact elements may be applied to the wall that is to be heated before the heating layer is generated (a priming coat may optionally be generated beforehand on the wall that is to be heated). In this case it is preferred for the heating paint to be applied (possibly first of all only) to the contact elements, in order for example to improve the application of further layers of the heating paint to the contact elements and to the wall that is to be heated (to generate the heating layer) and/or to improve the current flow between the contact elements and the heating layer. With preference the heating paint is applied not only between and to the contact elements (which, as described above, may have been precoated with the heating paint), but also beyond the other lengthwise side of the contact elements (i.e., beyond those lengthwise sides of the contact elements that do not define the space between the contact elements) and/or beyond the widthwise side of the contact elements, which is not joined to the transition element, onto the wall that is to be heated (or the pre-primed wall that is to be heated). As a result of this, the contact elements are completely surrounded by the heating layer on the lengthwise side and/or on the widthwise side of the contact elements which is not joined to the transition element. The only section of the contact elements not covered by the heating layer in that case is the section connected or connectable directly to the transition elements. Before the first application of the heating paint to the contact elements, it may be advantageous to degrease the contact elements, in order to improve the adhesion of the heating layer to the contact elements.

Transition Elements

On the contact elements, moreover, there are transition elements, via which the contact elements can be supplied with current and which each have at least one retaining element via which the transition element can be positively and/or nonpositively secured to the wall, in a region of the wall to be heated that bears no applied heating layer and no applied contact element. This ensures relief of mechanical load. In particular it is possible by this means to prevent (accidental) pulling on one of the two electrical leads from resulting in detachment of the corresponding contact element from the wall. Examples of such retaining elements for positive and/or nonpositive securement include one or more (e.g., two) screwed connections (preferably including one or more appropriately shaped recesses in the transition element) by which the transition element can be mounted on or is screwed to the wall, alone or with corresponding additional means (e.g., wall plugs); a positive body (e.g., in butterfly form), which fits positively into an appropriately shaped recess in the wall that is to be heated (including, possibly, under plaster); or a bayonet fastening.

Each of the transition elements is preferably connected to one of the terminals of the voltage source via an electrical lead, this connection advantageously being of undoable design (by means of a plug connection, for example). Each of the transition elements is connected, in particular with electrical conduction, to one of the two contact elements, by means, for example, of a clip connection, and this connection between the transition element and the contact element may be undoable in design.

The dimensions of the transition elements are advantageously such that they are able to accommodate the contact elements in their full width.

Control Element

The control element, present optionally in the surface heating device of the invention, comprises a voltage source (for the purpose of providing electrical voltage and/or electrical current) and a control device for controlling the surface heating device.

The term "voltage source" is intended in accordance with the invention to encompass any electrical energy source suitable for providing an electrical voltage and/or an electrical current. In one embodiment the voltage source is a power supply unit, i.e. an apparatus or an assembly which can be connected to the household power grid (typically 230 V AC±10%, 50/60 Hz) and supplies energy to other apparatuses or assemblies which require different voltages and/or currents from those provided by the household power grid. The power supply unit may be a switched unit or transformer unit. In one embodiment the voltage source provides an AC voltage (especially in the protective ultralow voltage range) or is configured and designed in such a way as to provide an AC voltage (especially in the protective ultralow voltage range). In an alternative embodiment the voltage source provides a DC voltage (especially in the protective ultralow voltage range) or is configured and designed in such a way as to provide a DC voltage (especially in the protective ultralow voltage range).

In one embodiment the voltage source is designed and configured such that it is able simultaneously to supply more than one (e.g., at least 2, at least 3, or at least 4) heating layers with voltage (and/or electrical current).

The control device is preferably configured and designed to control the surface heating device of the invention, in other words to control which electrical voltage and/or which electrical current are/is supplied to the heating layer (or heating layers) in order to reach the desired temperature.

For this purpose it is useful in one embodiment for the control element to have a thermostat, which more particularly is configured and designed so that it can measure and optionally monitor the temperature of the room in which the surface heating device of the invention is located. The thermostat is usefully configured and designed to be able to communicate with the control device. The thermostat is advantageously mounted in the room in which the surface heating device of the invention is located, but preferably not directly adjacent to a heating layer of the surface heating device of the invention, but instead, more preferably, on a wall bearing no applied heating layer (for example, the thermostat may be located on a wall of the room with the surface heating device of the invention that is opposite the wall to which the heating layer is mounted). In one embodiment the thermostat is configured and designed in such a way that the desired room temperature (intended temperature) can be set on the thermostat.

In one embodiment the control device in operation continuously measures the electrical current flowing through the heating layer (or heating layers), and compares it with a standard value/reference value. Consequently it is possible to ensure that malfunctions of the heating layer (e.g., sparking on the heating layer) or mechanical changes on the wall to be heated do not lead to an unsafe situation or hazard to persons and/or animals In one embodiment of the surface heating device of the invention, for example, the control element comprises an automatic voltage-source switch-off means. For this purpose, the control element may be configured and designed in such a way that it recognizes the incidence of sparks on the heating layer and, when such sparks occur, it activates the automatic switch-off means, i.e., it switches off the voltage source. Alternatively or additionally the control element is configured and designed in such a way that it monitors the amount of current flowing through the heating layer and activates the automatic switch-off means, i.e., switches off the voltage source, in the event of a deviation of at least 1% (such as at least 5% or at least 10%) in the current flowing through the heating layer from the standard value/reference value.

In one embodiment of the surface heating device of the invention, the control element comprises a temperature sensor on the heating layer. The temperature sensor is advantageously designed and configured to measure the temperature directly on or above the heating layer (if further layers have been applied over the heating layer) and to convey the measured data to the thermostat and/or the control device. It is possible as a result to prevent a potential hazard due to a disproportionately hot surface heating device (e.g., with a heating layer surface temperature of more than 40° C. (especially if the heating layer is mounted on a region of a wall that is accessible to persons) or with a heating layer surface temperature of above 70° C. or above 120° C. (especially if the heating layer is mounted on a region of a wall that is not accessible to persons)).

The control element may be mounted in the room containing the wall that is to be heated. In an alternative embodiment, the control element may be located elsewhere (e.g., in an adjacent room, in a central switch room or fuse room to which the room to be heated is connected, or in a basement).

To protect the surface heating device of the invention and/or to compensate unevennesses, it is possible for a protection and/or compensation layer to be applied, or able to be applied, to a part of the heating layer (e.g., only in the regions of the heating layer that are connected directly to the contact elements, since the heating layer there may be relatively thin) or to the complete heating layer and/or to exposed (i.e., projecting) regions of the contact elements. The protection and/or compensation layer may in one embodiment provide for electrical insulation of the heating layer with respect to the room. The protection and/or compensation layer may be generated in a manner which is known per se. Examples of such a protection and/or compensation layer are a layer of troweling compound, a layer of primer-sealer, a nonwoven tape, which in one embodiment is adherable, or a combination thereof. The protection and/or compensation layer advantageously is thermally conducting, and may also be electrically insulating.

Furthermore, a further paint layer may be or have been applied, as a topmost layer, which advantageously is thermally conducting.

The surface heating device of the invention may be used to generate temperatures typically encountered in the interior of a house (such as a residence), a temperature in the range from 15 to 30° C., for example. The maximum surface temperature of the heating layer in this case may be up to 40° C., particularly if the heating layer is mounted on a region of a wall that is accessible to persons (typically in a region of the wall at a distance from the floor of less than 2.5 m). If the heating layer is mounted on a region of a wall that is not accessible to persons (typically in a region of the wall at a distance of 2.5 m at least from the floor—for example, on a ceiling or on a corresponding slope of a room), the maximum surface temperature of the heating layer may be up to 120° C. (such as up to 110° C., up to 100° C., up to 90° C., up to 80° C. or up to 70° C.). One embodiment also provides for the surface heating device of the invention to be used to attain room temperatures that are higher than usual, such as temperatures which are encountered in a sauna (e.g. 80° C. to 120° C., such as 85° C. to 110° C.).

The surface heating device of the invention is especially suitable for heating a room irrespective of how the room is fitted out or where it is located. For example, the room may be a part of a house or building (i.e., stationary); the term "room", however, also includes mobile variants (such as shipping containers).

The term "wall" in accordance with the invention includes any room boundary, with the exclusion of windows. In particular, the term "wall", as well as the vertical walls (load-bearing or non-load-bearing), also encompasses any partition walls present, and any slopes and ceilings present in the room (including suspended ceilings).

The surface heating device of the invention has the advantage that it can be used to heat rooms in which the room air is to be moved as little as possible (e.g., hospital wards or operating theaters, the rooms of allergics, etc.). Another advantage is that the surface heating device of the invention is applied directly on a wall and in operation of the surface heating device the temperature of this wall is above the room temperature. Accordingly, water located on (or in) this wall will tend to evaporate (in contrast to conventional systems where water tends to condense on the walls), with the overall effect of preventing development of mold. Another advantage is that the surface heating device of the invention (particularly the heating layer thereof) can be used to provide shielding from electromagnetic radiation. To achieve this shielding, the heating layer is not supplied with electrical current or electrical voltage, but instead is connected to ground.

Kit for Producing a Surface Heating Device

The embodiments of the components of the kit of the invention are subject in full to the above statements made about the first (heating paint) and second (surface heating device) aspects of the invention.

In particular, the heating paint in the kit of the invention may be a heating paint in accordance with the first aspect of the invention as described above.

Furthermore, in one embodiment of the kit of the invention, the control element may comprise an automatic voltage-source switch-off means and/or a thermostat, as described herein for the second-aspect surface heating device of the invention.

In one embodiment of the kit of the invention, the two electrically conductive contact elements comprise electrically conductive metal strips, more particularly electrically conductive copper strips. Advantageously each contact element comprises an adhesive layer. The overall thickness of the contact elements is preferably not more than 100 µm, more preferably not more than 90 µm, more preferably not more than 80 µm, more preferably not more than 75 µm.

Uses and Methods

The heating paint of the invention and the kit of the invention can be used for producing a surface heating device, more particularly a surface heating device of the invention, on a wall. Besides its use for heating a room, the surface heating device of the invention also affords the advantage that it can be used to provide shielding from electromagnetic radiation. For this purpose, the heating layer is just not supplied with electrical current or electrical voltage, but is instead connected to ground.

The embodiments of the method of the invention for heating a room are subject in full to the above statements made about the first (heating paint) and second (surface heating device) aspects of the invention.

In particular, the application of the heating paint and/or the mounting of the contact elements, and also the optional application of further layers (such as a priming coat and/or protection and/or compensation layer and/or paint layer) may take place as described in connection with the surface heating device of the invention.

In one preferred embodiment of the method of the invention, the mounting of two contact elements for each of the at least one heating layer on the wall to be heated takes place before the step of applying the heating paint, and the applying of the heating paint comprises an application of the heating paint at least between and to the contact elements, with preferably the only section of the contact elements remaining uncovered by the heating paint being that connected or connectable directly to the transition elements.

In one preferred embodiment of the method of the invention, the heating paint is applied by means of rolling, spraying, spreading, brushing, knife coating, troweling, printing, or a combination thereof.

Described below with reference to the appended figures are a number of preferred exemplary embodiments which, however, are not limiting of the invention and are intended to be understood merely as exemplary embodiments of the invention. The elements of the figures are not necessarily shown true to scale in relation to one another. Unless otherwise indicated, elements in the figures that are the same, have the same function and the same effect are designated in each case by the same reference numerals.

FIG. 1 shows a schematic sectional view, not true to scale, of the surface heating device (1) of the invention as mounted on a (possibly already primed) wall (2) that is to be heated. This embodiment can be produced by first mounting the two contact elements (4) (e.g., copper strips) on the (possibly already primed) wall that is to be heated (using, for example, an adhesive layer (not shown)). Thereafter the heating layer (3) is generated using the heating paint of the invention, with the heating paint being applied not only between and on the contact elements (4) (which have preferably been precoated with the heating paint) but also beyond the other lengthwise side of the contact elements (4) (i.e., beyond those lengthwise sides of the contact elements (4) that do not construct the space between the contact elements (4)) to the (possibly already primed) wall (2) that is to be heated. As a result, the contact elements (4) on the lengthwise sides are completely surrounded by the heating layer (3). The heating paint is applied preferably (not shown in FIG. 1) to the (possibly already primed) wall (2) that is to be heated, beyond the widthwise side of the contact elements (4), which is not connected to the transition element (7), as well. As a result, the contact elements (4) are also surrounded fully by the heating layer (3) on the widthwise side of the contact elements (4), which is not connected to the transition element (7).

Furthermore, the surface heating device (1) shown in FIG. 1 comprises a protection and/or compensation layer (5) and also a concluding paint layer (6). In the embodiment shown in FIG. 1, the protection/compensation layer (5) does not completely surround the heating layer (3). In an alternative embodiment (not shown), the protection/compensation layer (5) may fully surround the heating layer (3).

Figure 2:
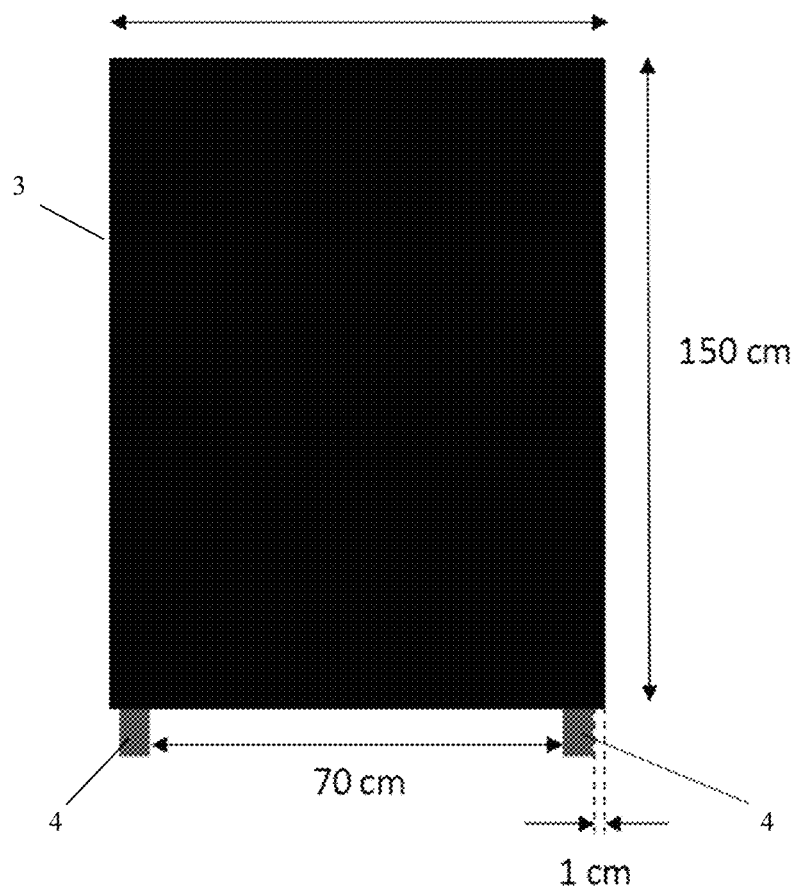
FIG. 2 shows a plan view of the surface heating device (1).

FIG. 2 shows a plan view of the surface heating device (1) of the invention, with only the heating layer (3) and also the protruding parts of the contact elements (4) being visible, and it indicates exemplary dimensions for the components of the surface heating device (1) of the invention that are shown. In the embodiment shown in FIG. 2, the heating layer (3) fully surrounds the contact elements (4) on the lengthwise sides and on the widthwise side of the contact elements which is not connected or connectable to the transition element. Only the lower section of the contact elements (4), which is directly connected or connectable to the transition elements, is not covered by the heating layer and can be used to connect the transition elements thereto.

Figure 3:
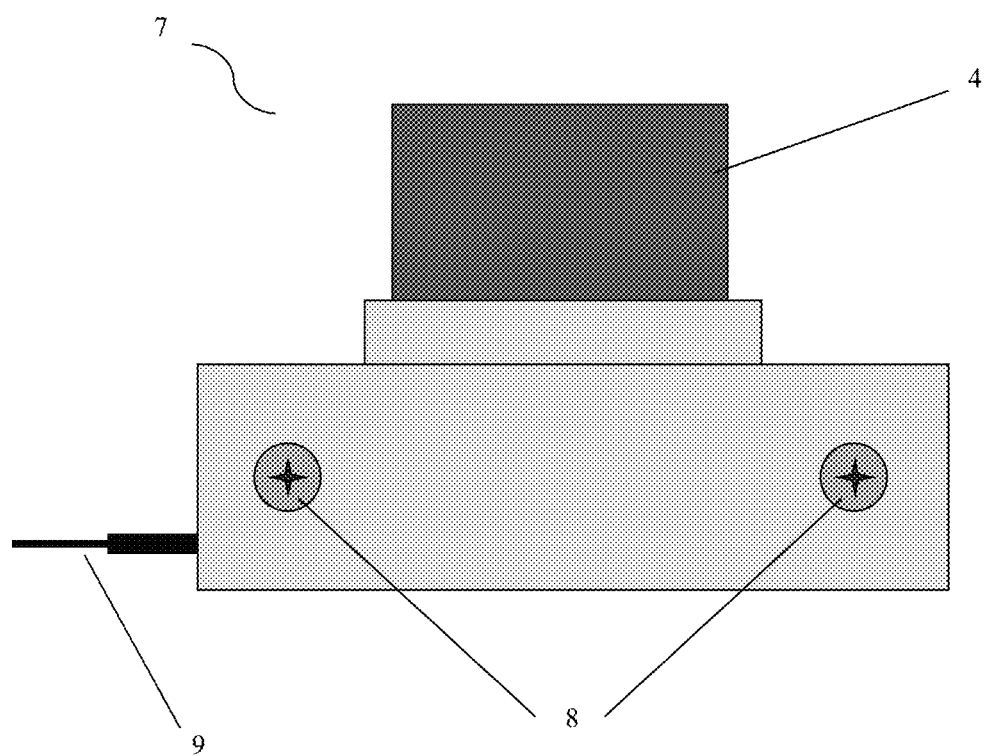
FIG. 3 shows a schematic plan view of an embodiment of the transition element (7).

FIG. 3 shows a schematic plan view of an embodiment of the transition element (7) which is electrically connected to the contact element (4) and to the electrical lead (9) and comprises two retaining elements (8) in the form of screws. In this embodiment the retaining elements (8) may be nonpositively secured in the wall that is to be heated, alone or with corresponding additional means (e.g., wall plugs). The connection between the transition element (7) and the electrical lead (9) is of undoable design (in the form of a plug connection).

Figure 4:
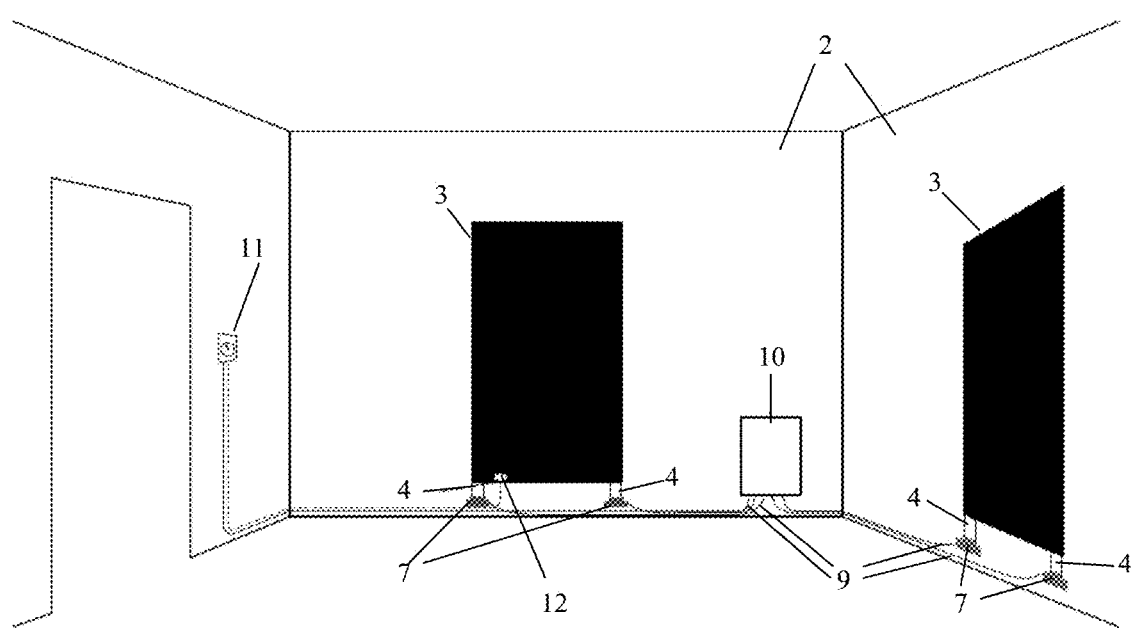
FIG. 4 shows a schematic representation of a surface heating device (1) of the invention with two heating layers (3), which are mounted on two adjacent walls (2) of a room.

FIG. 4 shows a schematic representation of a surface heating device (1) of the invention with two heating layers (3), which are mounted on two adjacent walls (2) of a room. The total of four contact elements (4) are each connected, with electrical conduction, to a transition element (7), and each transition element is connected, with electrical conduction, to the control element (10) via corresponding electrical leads (9). As shown in FIG. 4, the control element (10) may be mounted in the same room as the heating layers (3). In an alternative embodiment (not shown), the control element (10) may be located elsewhere (e.g., in an adjacent room, in a central switch room or fuse room to which the room that is to be heated is connected, or in a basement). Moreover, the embodiment shown in FIG. 4 comprises a thermostat (11) and a temperature sensor (12), whose purpose is to increase the operability and safety of the surface heating device of the invention (on the one hand because simple setting of the desired room temperature is realizable by means of the thermostat (11) and on the other hand because, by means of the temperature sensor (12), it is possible to recognize promptly a disproportionately hot surface heating device (e.g., with a temperature at the heating layer surface of above 50° C.) and to promptly eliminate it (e.g., by activation of an automatic switch-off means)).

LIST OF REFERENCE NUMERALS 1 surface heating device
2 wall to be heated
3 heating layer
4 contact element
5 protection/compensation layer
6 paint layer
7 transition element
8 retaining element
9 electrical lead
10 control element
11 thermostat
12 temperature sensor

The invention claimed is:

1. A surface heating device for heating a wall, comprising:
   (a) a heating layer which can be applied to the wall to be heated and comprises at least two conductivity additives and at least one binder, the conductivity additives comprising graphite and carbon black, the binder comprising an inorganic binder, and the heating layer being free from electrically conductive carbon fibers and carbon nanotubes, wherein the graphite is synthetic in origin, wherein the heating layer can be operated with a protective ultralow voltage in the range from 5 V to 48 V,
   (b) two electrically conductive contact elements, which can be or are arranged on the heating layer in such a way that the electrical voltage can be applied to the heating layer, and
   (e) two transition elements which are or can be mounted to the contact elements, each of the two transition elements comprising a retaining element for at least one of positively and nonpositively securing the transition element on the wall.

2. The surface heating device as claimed in claim 1, which further comprises:
   (c) a control element which comprises a voltage source and a control device for controlling the surface heating device, wherein the voltage source provides the protective ultralow voltage or is configured and designed for providing the protective ultralow voltage, and
   (d) two electrical leads, the first electrical lead being connected to one of the terminals of the voltage source, and the second electrical lead being connected to the other terminal of the voltage source,
   the first transition element connecting the first electrical lead, with electrical conduction, to one of the two electrically conductive contact elements, and the second transition element connecting the second electrical lead, with electrical conduction, to the other of the two electrically conductive contact elements.

3. The surface heating device as claimed in claim 1, wherein the two electrically conductive contact elements can be or are arranged on opposite marginal regions of the heating layer.

4. The surface heating device as claimed in claim 2, wherein the control element comprises an automatic voltage-source switch-off means.

5. The surface heating device as claimed in claim 1, wherein the two electrically conductive contact elements comprise electrically conductive metal strips.

6. The surface heating device as claimed in claim 1, wherein the two electrically conductive contact elements are arranged parallel to one another.

7. The surface heating device as claimed in claim 1, wherein the heating layer has the shape of a rectangle or parallelogram.

8. The surface heating device as claimed in claim 2, wherein the control element further comprises a thermostat.

9. A kit for producing a surface heating device on a wall, wherein the kit comprises:
   (1) a heating paint which comprises at least two conductivity additives and at least one binder, the conductivity additives comprising graphite and carbon black, the binder comprising an inorganic binder, and the heating paint being free from electrically conductive carbon fibers and carbon nanotubes, wherein the graphite is synthetic in origin,
   (2) at least two electrically conductive contact elements,
   (3) a control element which comprises a voltage source and a control device for controlling the surface heating device, wherein the voltage source provides the protective ultralow voltage or is configured and designed for providing the protective ultralow voltage,
   (4) at least two electrical leads, and
   (5) at least two transition elements which can be mounted to the contact elements, each of the two transition elements comprising at least one retaining element for at least one of positively and nonpositively securing the transition element on a wall.

10. The kit as claimed in claim 9, wherein the control element comprises at least one of an automatic voltage-source switch-off means and a thermostat.

11. The kit as claimed in claim 9, wherein the two electrically conductive contact elements comprise electrically conductive metal strips.

12. A method for producing a surface heating device on a wall using the kit as claimed in claim 9.

13. A method for heating a room or for shielding the room from electromagnetic radiation using the surface heating device as claimed in claim 1.

14. A method for producing a surface heating device on a wall, comprising the step of applying a heating paint to the wall for providing at least one heating layer,
wherein the at least one heating layer can be operated with a protective ultralow voltage in the range from 5 V to 48 V,
wherein the heating paint comprises at least two conductivity additives and at least one binder, the conductivity additives comprising graphite and carbon black, the binder comprising an inorganic binder, and the heating paint being free from electrically conductive carbon fibers and carbon nanotubes, wherein the graphite is synthetic in origin.

15. A method for heating a room, comprising the steps of:
(i) applying a heating paint to at least one wall of the room that is to be heated, to generate at least one heating layer, which can be operated with a protective ultralow voltage in the range from 5 V to 48 V, and
(ii) applying an electrical voltage to the heating layer, wherein the heating paint comprises at least two conductivity additives and at least one binder, the conductivity additives comprising graphite and carbon black, the binder comprising an inorganic binder, and the heating paint being free from electrically conductive carbon fibers and carbon nanotubes, wherein the graphite is synthetic in origin.

16. The method as claimed in claim 14, further comprising the steps of:

(a) mounting two contact elements for each of the at least one heating layer on the wall to be heated;
(b) providing two transition elements which can be mounted to the contact elements, for each of the at least one heating layer, each of the two transition elements comprising a retaining element for at least one of positively and nonpositively securing the transition element on the wall; and
(c) producing an electrically conducting connection between the first contact element and the first transition element and also between the second contact element and the second transition element for each of the at least one heating layer.

17. The method as claimed in claim 16, wherein the step (a) takes place before the step of applying the heating paint, and the applying of the heating paint comprises an application of the heating paint at least between and to the contact elements.

18. The method as claimed in claim 14, wherein the applying of the heating paint takes place by means of rolling, spraying, spreading, brushing, knife coating, troweling, printing, or a combination thereof.

19. The surface heating device as claimed in claim 1, wherein the transition element is secured on the wall in a region of the wall to be heated that does not bear any applied heating layer and any applied contact element.

20. The surface heating device as claimed in claim 4, wherein the automatic switch-off means are activated, i.e., the voltage source being switched off, when at least one of (I) sparks develop on the heating layer and (II) the current flowing through the heating layer deviates from the standard value by at least 1%.

21. The method as claimed in claim 14, wherein the heating paint further comprises at least one of a dispersion medium and one or more adjuvants.

22. The method as claimed in claim 15, wherein the heating paint further comprises at least one of a dispersion medium and one or more adjuvants.

\* \* \* \* \*